United States Patent [19]

Hornung et al.

[11] 4,219,747
[45] Aug. 26, 1980

[54] MECHANICAL APPARATUS FOR ACTIVATING NO LOAD CURRENT LIMITING CIRCUITS IN ELECTRIC MOTORS

[75] Inventors: Friedrich Hornung, Stuttgart; Fritz Schadlich, Leinfelden-Echterdingen, both of Fed. Rep. of Germany

[73] Assignee: Robert Bosch GmbH, Stuttgart, Fed. Rep. of Germany

[21] Appl. No.: 961,106

[22] Filed: Nov. 16, 1978

[30] Foreign Application Priority Data

Dec. 13, 1977 [DE] Fed. Rep. of Germany ....... 2755401

[51] Int. Cl.² ............................................. H02K 11/00
[52] U.S. Cl. ............................... 310/68 B; 310/68 C; 310/50
[58] Field of Search ............................. 310/40, 46–48, 310/50, 68 R, 68 A, 68 B, 68 C, 68 E; 361/31, 58; 30/388, 390, 391; 83/360, 390, 392; 318/430, 466, 475, 477, 331, 332, 345 R, 345 CB; 173/12

[56] References Cited

U.S. PATENT DOCUMENTS

| 2,793,305 | 5/1957 | Gerentes | 310/50 |
| 3,541,364 | 11/1970 | Bosch | 310/68 R |
| 3,585,427 | 6/1971 | Paule | 310/50 |
| 3,611,095 | 10/1971 | Schnizler | 310/50 X |
| 3,648,142 | 3/1972 | Corey et al. | 310/50 X |

Primary Examiner—Mark O. Budd
Attorney, Agent, or Firm—Frishauf, Holtz, Goodman & Woodward

[57] ABSTRACT

A mechanical switch is provided which, in a first position connects a current limiting circuit to a motor and, in a second position, disconnects the current limiting circuit from the motor. Mechanical activators are provided for the mechanical switch, to switch it from the first to the second position when the tool including the motor has a predetermined relationship to the workpiece. The mechanical activators provided for the mechanical switch operate the switch either when correct positioning of the tool relative to the workpiece results in a predetermined force being applied to the activator by the workpiece or when a shaft of the tool transmits a predetermined torque.

3 Claims, 8 Drawing Figures

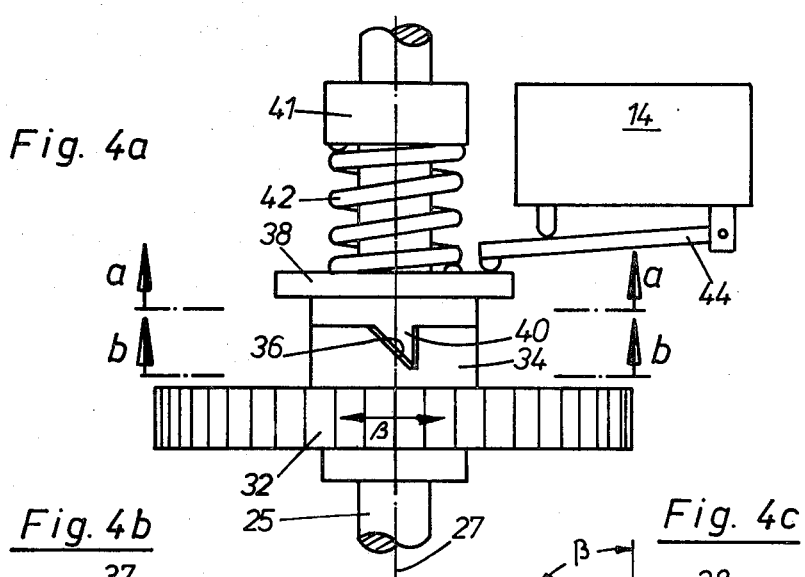
Fig. 4a
Fig. 4b
Fig. 4c
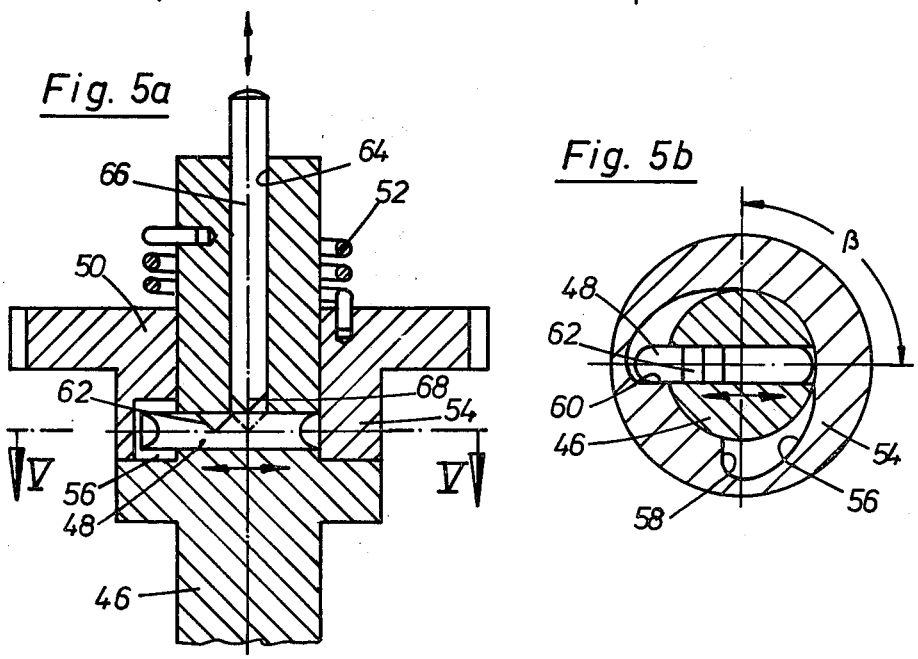
Fig. 5a
Fig. 5b

MECHANICAL APPARATUS FOR ACTIVATING NO LOAD CURRENT LIMITING CIRCUITS IN ELECTRIC MOTORS

The present invention relates to apparatus which decreases the no load speed in an electric motor and, more specifically, in an electric motor which forms part of an electrical tool. Specifically, it concerns electric tools in which a current limiting circuit is provided and in which a switch has a first position in which the current limiting circuit is connected in series with the motor and a second position in which the current limiting circuit is shunted.

BACKGROUND AND PRIOR ART

Apparatus is known which prevents current spikes in the motor circuit during the startup of the motor. In particular such current spikes are to be avoided, since in household appliances they may cause the blowing of fuses or the opening of circuit breakers.

In other known equipment, the no load speed of an electric motor in a processing machine is decreased by means of a current limiting circuit in order that the motor noise be decreased. This type of current limiting circuit includes a controllable semiconductor whose cut-in phase angle is varied as a function of motor current. This circuit requires a relatively large amount of electronic circuit elements, in particular because the controllable semiconductor and its heat sink must be designed for the maximum allowable motor current. This requires relatively expensive controllable semiconductor elements and also relatively expensive and large heat sinks. Further, the known circuits are subject to thermal overload even when properly designed. This thermal overload can lead to a destruction of the semiconductor elements. This is particularly the case for electric tools such as saws where the ventilating slits in the motor housing tend to become clogged and thus have a decreased cooling effect.

THE INVENTION

It is an object of the present invention to furnish a simple and reliable apparatus for decreasing the no load speed of electric motors and, in particular, of electric motors in tools or other processing machines. The apparatus is to allow use of cheaper semiconductor elements which do not have to carry the full load current.

The present invention is an improvement in electrical equipment for carrying out a predetermined operation on a workpiece, said equipment having a motor and current limiting means connected to said motor for limiting the current therethrough. The improvement comprises switch means having a first position wherein said current limiting means is connected in series with said motor and a second position shunting said current limiting means. The improvement further comprises mechanical activating means for switching said switch means to said second position when said motor has a predetermined relationship to said workpiece. In a preferred embodiment the predetermined relationship is a predetermined torque transmission from said motor to said workpiece. In an alternate preferred embodiment said predetermined relationship is a predetermined position of said electrical equipment and therefore of said motor relative to said workpiece. The predetermined position is, preferably, a position immediately preceding the application of load to said motor.

Thus, in accordance with the invention, the known circuits which have semiconductor elements in the current limiting circuit and in the corresponding control circuit are replaced by a switch having two switch positions, that is by a mechanical switch. With the aid of this switch a passive element such as a resistor or a capacitor and/or an inductance may be inserted into the motor circuit for limiting the current. Further, mechanical activating means for this mechanical switch are provided.

However, it should be noted that the improvement of a mechanical switch in conjunction with mechanical activating elements does not necessarily require that only passive elements be used in the current limiting circuit itself. Rather, semiconductor elements may be used for current limiting purposes in conjunction with the improvement. In the simplest case, only a diode in the motor control circuit is required, the diode causing half-wave operation of the motor with a correspondingly decreased power output while being simpler and less expensive than a controllable rectifier and requiring a current rating equivalent to only one-half the maximum motor current.

In a particularly preferred embodiment, the mechanical activating means include a sensing element which switches the switch means to the second position when the tool is correctly applied to a workpiece. In this embodiment the full motor power is available when it is actually required, while excessive noise due to excessively high no load speeds both before starting and during any pauses in the work is prevented.

In a further preferred embodiment an output element is provided whose position relative to the switch means changes when a predetermined torque is transmitted from a driven shaft to a torque receiving element. The torque receiving element has rotated to a predetermined angle relative to the driven shaft against the force of a spring when a predetermined torque is transmitted. This embodiment has the advantage that the motor is only switched to full power output when the requirement for this is indicated by the torque transmitted by the driven shaft. The driven shaft can be the output shaft of the motor itself or a shaft driven by gearing connected to the output shaft of the motor.

The possibility also exists that the second switch position, that is the shunting of the current limiting circuit, does not take place until both the workpiece is correctly positioned relative to the tool and a predetermined torque is being transmitted. However it is not expected that this type of embodiment would have much practical application, one or the other of the criteria being in general sufficient.

A preferred embodiment with a sensing element is particularly to be recommended for circular saws, planing tools, belt sanders, drills, percussion drills, chain saws and the like for which the tool must always be in a defined position relative to the workpiece. The sensing element therefore senses not only that the tool has been applied to the workpiece but also whether or not the position of the tool relative to the workpiece is correct. If required, more than one sensing element may be used and, further, elements already present in the tool, such as a tilting saw blade cover, might be utilized for the sensing element. Specifically, the movement of such a cover may be used directly for activating the switch or indirectly for example through a Bowden cable.

The embodiment which senses the predetermined torque transmission is particularly suitable for electric tools which may be moved freely relative to the workpiece as is, for example, the case for angle sanders or other driving engines or prime movers which do not have to be applied to the workpiece, or at any rate do not have to assume a predetermined position relative to the workpiece.

DRAWING ILLUSTRATING PREFERRED EMBODIMENTS

FIGS. 4a-4c are diagrams showing the mechanical activator of a preferred embodiment of the present invention, FIG. 4a being a side view and FIGS. 4b, 4c being sectional views along lines a—a and b—b respectively;

FIGS. 5a, 5b show details of a mechanical activator for an alternate embodiment of the present invention, FIG. 5a being a partly sectional side view and FIG. 5b being a sectional view along line V—V in FIG. 5a.

Figure 1:
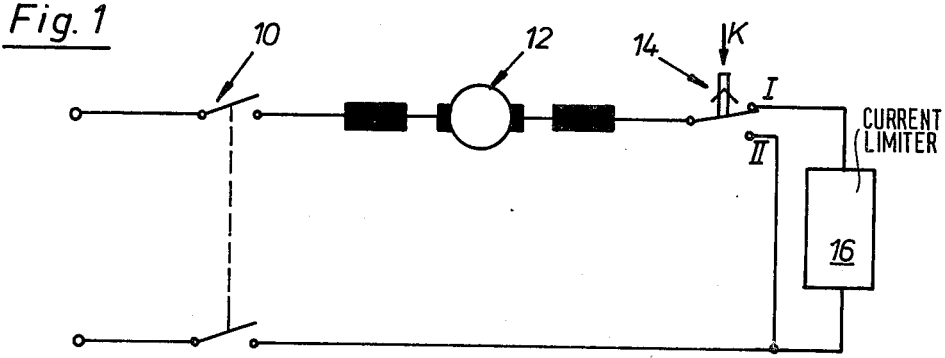
FIG. 1 is a schematic over-all diagram of the equipment according to the present invention.

FIG. 1 shows a two pole on/off switch 10 for connecting the electrical circuit of a motor 12 to an AC supply. Motor 12 can be connected directly across the supply or to the supply in series with a current limiting circuit 16, depending upon the position of a mechanical switch 14. In a first position of switch 14, namely the position shown in FIG. 1, the current limiting circuit is connected in series with the motor. When a force K is applied to switch 14 it is switched to a second position in which current limiting circuit 16 is shunted so that motor 12 is directly connected to the electrical supply if switch 10 is closed.

The force K for activating switch 14 is generated by mechanical activating means which will be described in detail with reference to FIGS. 2-5.

Figure 2:
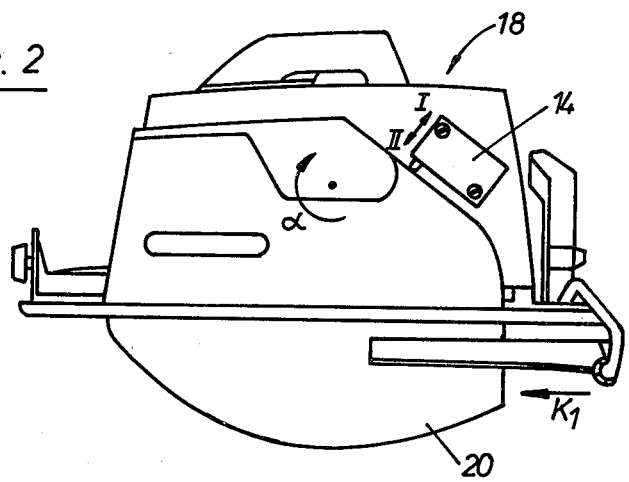
FIG. 2 is a side view of an electrical circular saw including a preferred embodiment of the present invention.

In FIG. 2, a manually operable electrical circular saw 18 is equipped with a switch 14, which corresponds to switch 14 of FIG. 1. Saw 18 has a protective cover 20 for the blade which is not shown. When the protective cover 20 is tilted by an angle α, switch 14 is switched to its second position. The switching to the second position, that is the shunting of current limiting circuit 16, thus takes place when the saw is advanced against the workpiece and the latter exerts a force $K_1$ onto the front edge (at the right in FIG. 2) of the protective cover 20. The tilting angle α of protective cover 20 can be so chosen that full power is applied to the electric motor when saw 18 has been advanced to such an extent that the workpiece will be engaged immediately thereafter.

Figure 3:
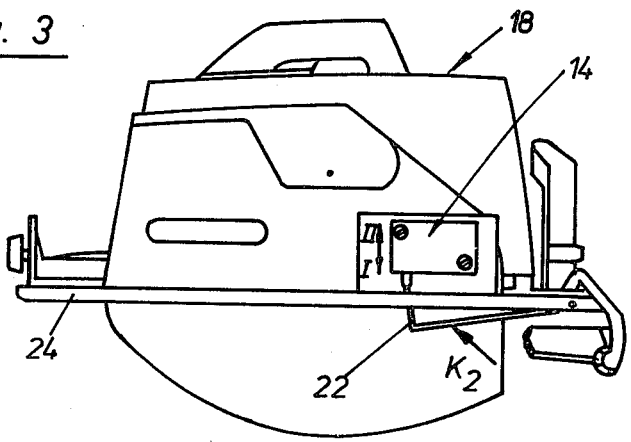
FIG. 3 is a side view of an electrical circular saw with an alternate embodiment of the present invention.

The situation shown in FIG. 3 is similar to that in FIG. 2. However, in FIG. 3, the switching of switch 14 of saw 18 does not take place in dependence on the tilting of the protective cover 20, but instead depends upon the activation of an elastic lever or feeler 22. Feeler 22 is only pushed against switch 14 to a sufficient extent when a force $K_2$ is exerted against it by the workpiece. This force is only exerted when a guide surface 24 of saw 18 is flush with the upper surface of the workpiece. Thus the blade cannot cut with full power or become jammed with full power when the saw is improperly applied to the workpiece. If the motor stalls because the saw is applied in the wrong direction relative to the workpiece, feeler 22 does not receive sufficient force, so that the motor is operating at a reduced power input thereby reducing the danger for the user of the saw. Further, the possibility of cuts in the wrong direction or frayed cuts by the saw is substantially decreased.

FIG. 4 shows a driven shaft 25, for example the output shaft of the drilling machine, which has a recess 26 in which lies a key 28. Key 28, in turn, projects into a recess 30 of a wheel 32 which, for example, may be a gear wheel. Recess 30 of wheel 32 is sufficiently broad that the wheel may be turned by an angle β relative to shaft 25. Wheel 32 has a collar 34 with a recess 36. The trailing edge (viewed in the direction of rotation of shaft 25) of recess 36 is inclined, for example by an angle of 45° relative to the lengthwise central axis 27 of the shaft. Further mounted on shaft 25 is a ring 38. A key 37 prevents relative rotation between ring 38 and shaft 25 but allows axial displacement. Ring 38 has a tooth 40 or a latch of a shape complementary to recess 36. Ring 38 is prestressed in the direction towards wheel 34 by means of a spring 42 cooperating with an abutment 41. Thus, under no load conditions, tooth 40 is retained in recess 36. When, however, rotating shaft 25 causes wheel 32 to transmit a predetermined torque, then wheel 32 rotates relative to shaft 25 and pushes tooth 40 out of recess 36. The pushing out of tooth 40 causes a corresponding axial movement (upwards in FIG. 4) of ring 38 against the force of spring 42. The axial movement of ring 38 is transmitted to lever 44 of switch 14 thereby switching switch 14 from its first to its second position. Full load is now applied to motor 12.

In FIG. 5, a driven shaft 46 is equipped with a key 48 which is slidably positioned in a bore of the shaft which extends perpendicular to its lengthwise axis. Key 48 is longer than the diameter of the shaft. A wheel 50 is carried on shaft 46. A torsion spring 52 couples wheel 52 shaft 46. Wheel 50 has a collar 54 with a recess 56 whose shape is shown in FIG. 5b. The inside wall of recess 56 serves as a guide surface for key 48.

When wheel 50 is to transmit a torque to another wheel (not shown) or when a corresponding torque is transmitted from shaft 46 to wheel 50, then the latter turns relative to shaft 46 in opposition to the force of torsion spring 52. This causes key 48 to be moved by the inside wall of recess 56 in a direction perpendicular to the longitudinal axis of shaft 46 until that end of key 48 which is shown inside shaft 46 in FIG. 5b abuts against surface 58 of recess 56. Surface 58 thus serves as an end stop. Upon removal of load from shaft 46, the arrangement returns to the condition shown in FIG. 5b wherein key 48 abuts surface 60 of recess 56. Thus surface 60 serves as the second end stop for key 48.

Key 48 has a V-shaped recess 62, which, preferably, subtends an angle of 90°. The free end of shaft 46 (the upper end of FIG. 5a) has a center bore 64. An axially movable pin 66 is positioned in bore 64. The inside end of pin 66 has a tip 68 which has a shape corresponding to the shape of recess 62. Pin 64 can drop into recess 62 when key 48 is moved to abut against surface 58 of recess 56 in collar 54 of wheel 50. Pin 66 thus executes an axial movement when a predetermined torque is transmitted from shaft 46 to wheel 50. This axial movement can be utilized to activate switch 14 in a manner similar to activation of switch 14 in FIG. 4. When load is removed from shaft 46, torsion spring 52 returns wheel 50 to its original position causing pin 66 to be pushed by key 48 into the position illustrated in FIG. 5a, so that switch 14 also returns to its first position.

It is a particular advantage of the enbodiment shown in FIG. 5 that the construction of the mechanical activator is particularly simple. However, the embodiment of FIG. 5 can only be used when the end of a shaft is freely accessible and it is also possible to mount a switch such that axially movement of the pin can switch it back and forth between its first and second position.

Various changes and modifications may be made within the scope of the inventive concepts.

We claim:

1. In an electrical, manually operable circular saw having a motor (12);
    a blade;
    a tiltable protective cover for said blade;
    current limiting means (16) connected to said motor for limiting the current therethrough;
    switch means (14) having a first position connecting said current limiting means in series with said motor and a second position shunting said current limiting means;
    said switch means being mounted relative to said portective cover such that tilting of said protective by a predetermined angle switches said switch means to said second position, said predetermined angle defining a position of said cover immediately preceding application of the blade to a workpiece and hence immediately preceding application of a load on said motor,
    said protective cover forming a sensing element sensing when the saw is in a predetermined relation to the workpiece,
    whereby the motor will be started with said current limiting means connected by said switch means in said first position, and will be switched over to full power immediately preceding application of the load on the motor.

2. In an electrical equipment for carrying out a predetermined operation on a workpiece, having
    a motor (12) having a driven shaft (26, 46);
    current limiting means (16) connected to said motor for limiting the current therethrough;
    switch means (14) having a first position connecting said current limiting means in series with said motor and a second position shunting said current limiting means;
    and mechanical activating means switching said switch means to said second position when said motor has a predetermined relationship to said workpiece and provides a predetermined torque, comprising
    torque receiving means (32; 50) spring-mounted on said driven shaft and adapted to rotate a predetermined angle ($\beta$) relative to said driven shaft upon transmission of a predetermined torque from said driven shaft to said torque receiving means;
    and an output element (64; 44) mounted on said torque receiving means for switching said switch means to said second position when said torque receiving means has rotated through said predetermined angle relative to said driven shaft.

3. Equipment as set forth in claim 2, wherein said torque receiving means comprises a wheel (50) having a collar (54) having a wheel recess (56), and torsion spring means (52) for coupling said wheel to said driven shaft;
    wherein said shaft has a longitudinal axis and a bore in the direction perpendicular to said longitudinal axis;
    a key (48) slidably positioned in said bore and extending into said wheel recess, said wheel recess having a first (58) and second (60) surface respectively constituting a first and second end stop for said key;
    said key, when in a first position abutting said first end stop when said wheel has rotated said predetermined angle relative to said driven shaft;
    and wherein said key has a key recess (62) for receiving said output element, said key recess being aligned with said output element only when said key is in said first position, whereby the position of said output element relative to said switch means changes when said key moves into said first position.

* * * * *